United States Patent [19]

Angel

[11] Patent Number: 4,800,973

[45] Date of Patent: Jan. 31, 1989

[54] PORTABLE ELECTRONIC SCALE OF MINIMAL THICKNESS AND WEIGHT

[76] Inventor: Shlomo Angel, 175, Ranong 1 Road, Bangkok 10400, Thailand

[21] Appl. No.: 163,895

[22] Filed: Mar. 4, 1988

[51] Int. Cl.⁴ .......................... G01G 3/14; G01L 1/22
[52] U.S. Cl. ................................. 177/211; 177/210 C; 73/862.65
[58] Field of Search ........................ 177/211, 210 DC; 73/862.65

[56] References Cited

U.S. PATENT DOCUMENTS

| | | |
|---|---|---|
| D. 274,991 | 8/1984 | Wirtz . |
| D. 281,236 | 11/1985 | Muller et al. . |
| D. 288,071 | 2/1987 | Muller . |
| 2,910,287 | 12/1955 | Hags . |
| 4,043,413 | 8/1987 | Schaenen . |
| 4,174,760 | 11/1979 | Curchod . |
| 4,355,692 | 10/1982 | Ostrelich .............................. 177/211 |
| 4,363,368 | 12/1982 | Paddon et al. .................. 177/211 X |
| 4,685,526 | 8/1987 | Holm .................................... 177/211 |
| 4,739,848 | 4/1988 | Tulloch ............................... 177/211 |

Primary Examiner—George H. Miller, Jr.
Attorney, Agent, or Firm—Bryan, Cave, McPheeters & McRoberts

[57] ABSTRACT

A portable electronic scale of minimal thickness and weight is provided which is suitable for measuring the weight of an individual or object and which can be easily carried in a bag, stored in a cabinet or hung on a wall. The scale comprises a single load-bearing composite plate of composite (sandwich) construction with its principle strength concentrated on its top and bottom surfaces, and including a center core plate which includes a number of small cavities for electronic components. A plurality of shallow supporting feet exert a force from below on a plurality of mechanically deformable elements embedded rigidly in the composite plate, which force is measured and translated by electronic transducers such as strain gauges into electrical signals. These signals are summed in a Wheatstone bridge configuration, amplified and converted electronically to a digital display of the weight. The electronic circuitry fits within the composite plate and consumes very small amounts of current when in use so that the need for a thick battery is eliminated. The scale (excluding the shallow feet) is less than ¼" in thickness and weighs less than one pound.

6 Claims, 5 Drawing Sheets

PORTABLE ELECTRONIC SCALE OF MINIMAL THICKNESS AND WEIGHT

BACKGROUND OF THE INVENTION

1. Field of the Invention

This invention relates to a portable electronic scale of minimal thickness and weight which can be easily carried in a bag, stored in a cabinet or hung on a wall, for measuring the weight of persons or objects.

2. Description of the Prior Art

Most small scales, such as those used for personal weight measurement, require that the person stand or the object be placed on a flat and rigid load-bearing plate, which rests on a set of levers touching the plate from below at a number of discrete points. The levers rest on a second load-bearing plate which is, in turn, placed on a flat floor. The levers are connected in such manner that when a load is placed on the top plate, the levers exert a load at a single point which is equal to the total load on the top plate. This load is then measured, either by balancing it against a known load as in the scales commonly found in clinics, or by applying that load to a mechanically deformable element, such as a spring or a beam, and measuring the deformation. Common "portable" bathroom scales usually measure the movement of a spring by rotating a dial. Newer scales measure the deformation of a spring or an alternative mechanically-deformable element electronically, with strain gauges or capacitors, and display the measure digitally, usually with a light-emitting diode (LED).

The lever mechanisms, the two (or more) load-bearing plates and the power requirements for the LED's usually impose discrete weight and thickness requirements on most known scales, making them too heavy and too bulky to be easily transported from place to place. The smallest scales for personal weight measurement, for example, weigh several pounds and are about one to three inches in thickness. This makes it difficult for them to be carried so that an individual can watch his or her weight while away from home. It also makes it difficult to lift the scales and store them in a cabinet or hang them on a wall when floor space (such as in a bathroom) is limited.

A different principle for constructing a scale which does not require any lever mechanism for the mechanical transfer of loads for measurement at a single point has been in operation in some industrial scales for some time. It involves placing a rigid plate on a plurality of mechanically deformable elements, connecting force transducers such as strain gauges to these elements and summing up the electrical signals from these transducers in a Wheatstone bridge balancing circuit to obtain a measure proportional to the total load on the plate. Because the load on the plate is the sum of all the loads on the elements, this measure is the same regardless of the distribution of the load on the plate.

Ostrelich U.S. Pat. No. 4,355,692 cites several U.S. patents for industrial scales operating on this principle, namely U.S. Pat. Nos. 4,150,729; 3,949,822; 3,966,003; and 4,146,100. Ostrelich then describes an application of this principle to a small scale for weighing persons, proposing to reduce the cost of manufacturing by replacing the more-common strain gauge transducers with a thick film resistor. He describes a weighing scale in which a load impressed on a plurality of spaced individual transducers is electrically added to indicate a total weight of the load. While not claiming that application of this principle for small scales for weighing persons is new, he does state that the application of the thick film resistors makes it possible to produce a scale of a very limited vertical dimension. The embodiments described by Ostrelich, however, impose discrete thickness as well as weight requirements on the scale incorporating the same. While the film resistors themselves, like strain gauges, are less than 0.01" in thickness, there are a number of other mechanical and electrical components with discrete thickness and weight requirements that are required for the scale. In the embodiments described by Ostrelich, each transducer is mounted on a load-bearing base plate, and placed under pressure by means of a pair of pins separating the base plate from a loading plate and a spaced load-bearing cover plate, which bear the applied load and transmit it to the transducers. The three spaced load-bearing plates, and the intermediate force-transmitting pins, impose discrete thickness and weight requirements on the scale incorporating the same. The Ostrelich device additionally incorporates a fairly large battery cell for powering the electronic circuit and the LED, further increasing the thickness of the scale assembly.

Similar thickness and weight requirements are encountered with the small scales disclosed in Curchod U.S. Pat. No. 4,174,760; Schaenen U.S. Pat. No. 4,043,413; Hags U.S. Pat. No. 2,910,287; and Paddon et al. U.S. Pat. No. 4,363,368, for example.

These discrete thickness and weight requirements have been found in all known industrial, medical and personal scales produced to-date, thus making it difficult to transport them in bags while travelling, to lift them for a closer look, to store them in a cabinet or to hang them on the wall so as to keep them away from the floor. Even though many scales are advertised as being "portable", they are rarely small or light enough to be easily moved. For a scale to be truly portable, it should be considerably thinner and lighter than scales produced to date, e.g. ¼" or less in thickness and 1 lb. or less in weight.

SUMMARY OF THE INVENTION

The weight and thickness requirements for truly portable and at the same time accurate scale are achieved in the present invention, overcoming the disadvantages of the prior art.

The scale of the present invention is lightweight, portable and of a very low profile, comprising:

(a) a single rigid load-bearing composite plate having substantially flat upper and lower surfaces, the composite plate being of suitable size and strength to support the weight of a person standing or object placed thereon;

(b) a plurality of supporting feet upon which the load-bearing composite plate is mounted, the feet being spaced across the under-surface of the composite plate to support a load placed on the top surface thereof;

(c) a plurality of thin transducers containing mechanically deformable elements and means for translating the deformations into electrical signals, aligned with and mechanically linked to the respective supporting feet and free to deform when subject to a force exerted by the feet from below; and (d) electronic means of low power consumption and low vertical profile for powering the transducers and for summing their signal outputs and providing a read-out thereof, housed within the composite plate. The transducers and electronic means are contained within the composite plate so as not to reduce its rigidity or increase its thickness.

The scale of the present invention provides accurate weight measurements and is thin and light enough to be easily transported by an individual, even within a small briefcase or bag. The composite plate is made up of two or more layers rigidly bonded to one another in a sandwich construction, making it possible to concentrate the compressive and tensile strength of the plate on its top and bottom surfaces. In one embodiment described herein, an intermediate layer (center core plate) is provided between the top and bottom layers. This center core plate acts mainly in shear with minimal need for high tensile or compressive strength, and can then be made of a material or structure of very light weight. While the top and bottom layers require heavier material for strength, they may nevertheless be extremely thin and therefore light in weight as well. The sandwich construction of the composite plate allows the layers to act structurally as a single rigid plate of minimal weight and thickness. In addition, the rigidity of the assembly makes it possible to raise it above the floor with a plurality of shallow feet located near the periphery of the plate, without causing the plate to touch the floor due to deflection caused by loading. The feet thus add only a minimal thickness (e.g., 0.2") to the scale as a whole.

The load exerted downwards on the plate produces an equal and opposite force exerted upwards by the plurality of feet on the transducers. This permits the shallow feet themselves, which are needed to raise the plate above the floor in any case, to be used as an integral part of the load-measuring mechanism, and eliminates the need for separate force-transmitting pins or other load carrying members to act on independent transducer means, thus further reducing the required thickness of the scale. Measuring the upward loads exerted by the feet on the transducers embedded in the composite plate also eliminates the need for the multiple, separate plate structures proposed by Ostrelich, where a number of individual plates are needed—two to bear the load and one to house the transducers.

In accordance with a further feature of the invention, the electronic means for summing the signal outputs of the several transducers comprises:

(i) signal generating means for supplying a signal to each force transducer;

(ii) means suitable for connecting a power source to the signal generating means;

(iii) a Wheatstone bridge configuration of the transducers;

(iv) an analog amplifier connected to output of the Wheatstone bridge for amplifying the output thereof;

(v) an analog-to-digital converter connected to the output of the amplifier;

(vi) a display driver and display connected to the output of the analog-to-digital converter; and (vii) switch means for enabling power to flow to the circuit;

the electronic means operating to provide a display of weight information which corresponds to the cumulative signal outputs of the transducers.

It is possible to employ a wide variety of thin force transducers or load cells in the present configuration. They may include a number of beam configurations with strain gauges bonded onto them; diaphragm-type transducers with strain gauge bonded onto them; capacitance-type transducers; piezo-electric crystals; diaphragms compressing a confined mass of carbon; or the thick film resistors proposed by Ostrelich.

The force transducers incorporated in a preferred embodiment of the present invention comprise:

(i) mechanically deformable beams which are free to deflect upwards in response to a force exerted by the feet from below when the composite plate is loaded from above, the beams being defined by slots cut into a thin disc or other member bonded onto the composite plate; and (ii) strain gauge means comprising at least one strain gauge bonded to each beam and positioned so as to provide a signal output directly proportional to the deflection of the beam and to the load on the beam.

The circuitry which powers the transducers has a very batteries, such as lithium "coin"-type b tteries commonly found in electronic calculators and the like.

The scale of the present invention features, yet the entire composite plate is only one-quarter inch or less in thickness, the feet are less than 0.2" in height, and the entire embodiment weighs less than one pound.

DESCRIPTION OF THE PREFERRED EMBODIMENT

Figure 1:
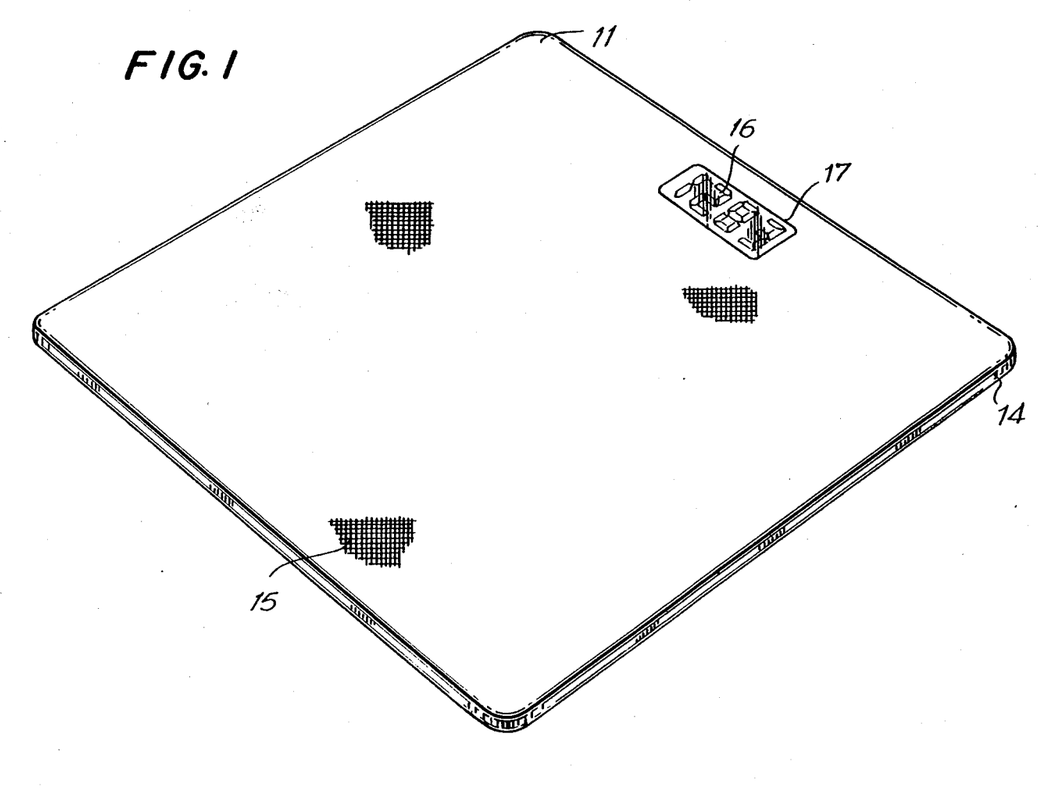
FIG. 1 is a perspective view of a embodiment of the electronic personal scale of minimal thickness and weight of the present invention.
Figure 2A:
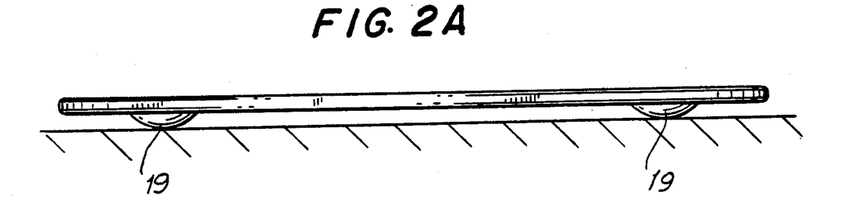
FIG. 2 is an end elevation view of the scale of FIG. 1.
Figure 2B:
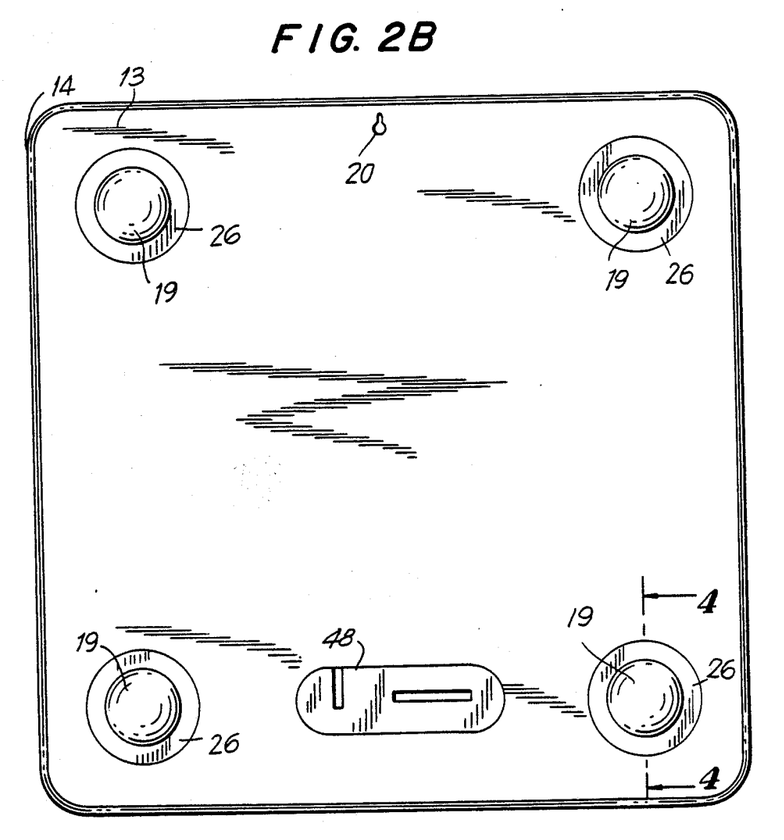
FIG. 2B is a bottom plan view of the scale of FIG. 1.
Figure 3:
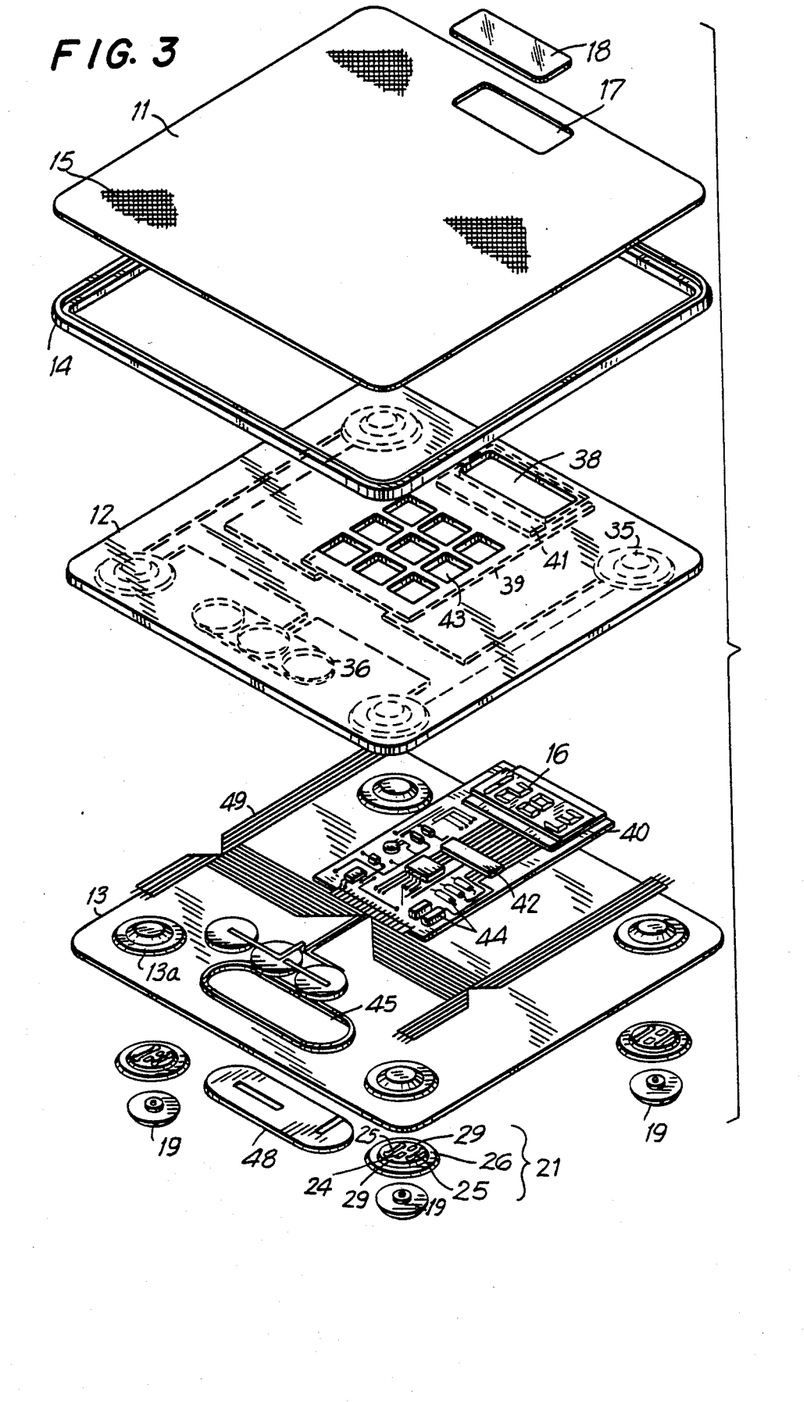
FIG. 3 is an exploded isometric of the scale of FIG. 1 showing a three-layer composite plate.

Referring first to FIGS. 1, 2A, 2B and 3, there are shown overall views of a preferred embodiment of the low-profile electronic personal scale of minimal thickness and weight of the present invention. As best illustrated in FIG. 3, the scale housing comprises a load-bearing composite plate of extremely thin layers or plates in a sandwich-type construction. The layers of this construction comprise a top plate 11, a center core plate 12 and a bottom plate 13. The layers are normally hidden from view by a marginal edge strip 14 placed around the periphery of the assembly. The marginal edge strip may be of plastic, rubber or other shock-absorbing material and is attached to the outside periphery of the plates 11, 12, 13 for protection and waterproofing. Alternatively, top plate 11 could be constructed so as to extend down over center core plate 12 and bottom plate 13, to form a continuous smooth surface without the need for edge 14, to protect the layers of the composite plate.

There are several variations possible in constructing the composite plate so as to keep it thin and light and yet sufficiently strong to carry a load, such as a heavy person, without deflecting appreciably. In addition to the three-layer sandwich plate discussed in detail and shown in FIG. 3, it is possible to construct the composite plate from two bonded plates in sandwich construction as shown in FIG. 4D, in particular, (i) an upper plate made of moulded light-weight material of high elastic modulus with a substantially flat top and a set of cavities below formed by an arrangement of shallow ribs; and (ii) a bottom plate similar to that shown in FIG. 3.

In FIG. 3, the plates are roughly rectangular in shape in the preferred embodiment, although oval, trapezoidal or any other configurations may alternatively be employed. These may have flat plates of a variety of sizes, depending on the size and shape of the objects to be measured. Among other forms of roughly rectangular shapes, it is possible to construct scales with the principles embodied here that are half the size of a plate needed to stand on with both legs. Such a half-size scale may be used for weighing a person standing on one leg. Furthermore, it is possible to construct scales which fold into two with different size plates (including the half-sized plate for standing on one leg) and with a different number and arrangement of feet to ensure stability and to prevent the scale from touching the floor near the hinge area. The feet in the folding versions can fit into cavities in the plate so as not to protrude from the scale when it is folded. Such folding scales may be more convenient for use in travelling.

Top plate 11, which is preferably of steel, aluminum, or other rigid metal, plastic or like material of high elastic modulus and high tensile and compressive strength, defines a surface which is rigid enough and large enough to permit an adult to place both feet on the scale for weighing. Bottom plate 13 is preferably of a material of similar structural properties acting in tension when the composite plate is loaded from above. Bottom plate 13 also provides a housing for the transducers and protects the internal mechanical and electrical measuring components from below.

The center core plate 12 is preferably made from very light-weight, rigid material (e.g., polyurethane foam) or a grid or honeycomb arrangement of a heavier material, but overall light in weight, acting in shear when the composite plate is loaded from above, and defining various cavities for housing the transducers and the electronic components of the scale. The three layers of the composite plate preferably are bonded together with adhesive, although they may be riveted, screwed or otherwise attached to one another. The top and center plate may also be made of the same material and moulded into one single entity as shown in FIG. 4D. The several layers of the assembly thus act structurally as a single load-bearing plate.

Referring now to FIGS. 1 and 3, top plate 11 may contain over a substantial portion of its surface a coating 15 of non-slippery material warm to the touch, such as rubber, roughened plastic or other non-metallic material to provide adhesion for safety and a non-metallic surface for warmth. A liquid crystal display (LCD) 16 provides a visible read-out of the weight on the scale. Display 16, shown through opening 17, is preferably covered with a transparent display cover 18 for protection and waterproofing.

As best shown in FIGS. 2A, 2B, 3, 4A, 4C, and 4D, a plurality of supporting feet 19 are provided, attached to the bottom plate 13. The supporting feet are spaced across the under-surface of bottom plate 10, preferably positioned near the corners thereof. The feet need not extend more than 0.2" from bottom plate 13. Feet 19, in addition to keeping the composite plate above the floor to prevent it from getting wet, also perform important load-transferring and weighing functions in the present invention. A silicone or other seal 22 (see FIG. 4A) provides waterproofing.

The feet 19 have a spherical bottom but many other shapes of feet which touch the floor at a point below the center of the transducer beams 24 (described below) are possible. It is also possible to use hard rubber or plastic on the bottom of the feet without adding to their overall height so as not to scratch the floor. It is further possible to add height to the feet with separate components which fit under them or replace the feet with higher feet when the scale is to be used on a thick carpet.

Directly above each supporting foot 19 is a transducer or load cell assembly 21. The transducer assemblies 21, which are best seen in FIGS. 3, 4A, 4B, 4C, and 4D, perform the actual mechanical weight measurement functions of the present invention. In an improvement over the prior art, the transducer assemblies are mechanically linked directly to the respective supporting feet 19 aligned therewith.

In the preferred embodiment, each transducer assembly 21 comprises a transducer body 23 having a transducer beam 24, defined therein by slots 25. Transducer body 23 preferably is a shallow conical or cylindrical structure made of metal, composite material or other material of high elastic modulus (e.g. steel), and having substantially flat top and bottom surfaces and a horizontal lip 26.

In the preferred embodiment, slots 25 are cut all the way through transducer body 23 and are substantially parallel to each other, although this is not required. There are many possible configurations of slots which may define a single beam, a pair of cross beams, or several beams in the shape of a star. It is also possible to construct a transducer body 23 without any slots at all acting as a thin diaphragm where the supporting foot 19 is bonded to the center of the diaphragm from below. As shown in FIG. 4B, slots 25 are also slightly enlarged at each end to establish areas of stress concentration at the ends of the beam. Further, the aligned supporting foot 19 is directly linked to transducer beam 24, thus providing a simplified, extremely thin scale construction.

Figure 4A:
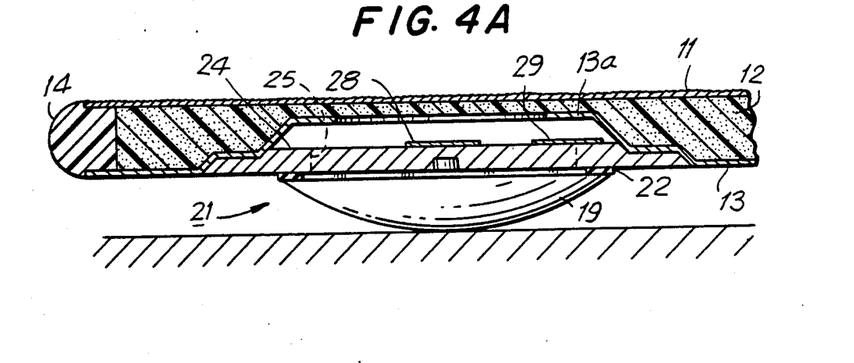
FIG. 4A is an enlarged, partial vertical section through the scale of the present invention with a three-layer composite plate, taken along line 4—4 of FIG. 2B.
Figure 4B:
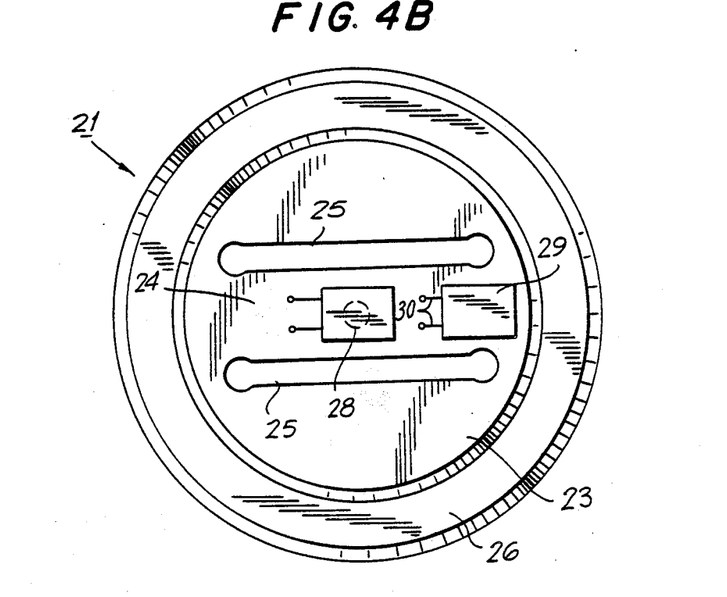
FIG. 4B is a top plan view of the transducer assembly of FIG. 4A.
Figure 4C:
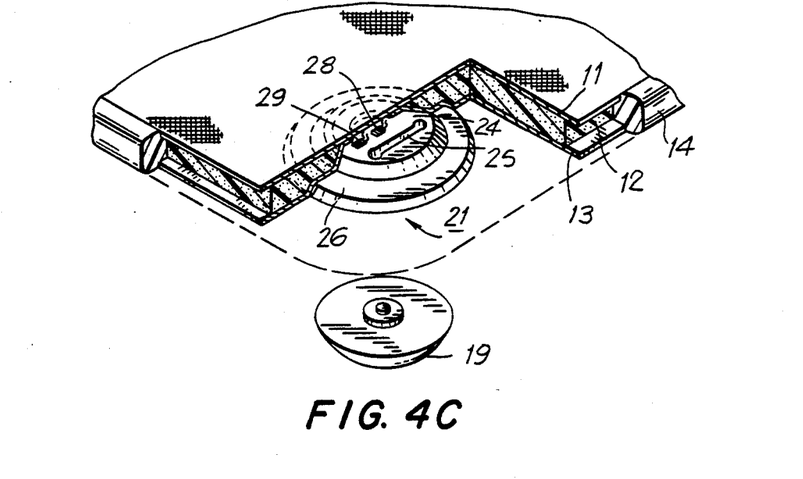
FIG. 4C is a cut-away isometric view of the transducer assembly of FIG. 4A.
Figure 4D:
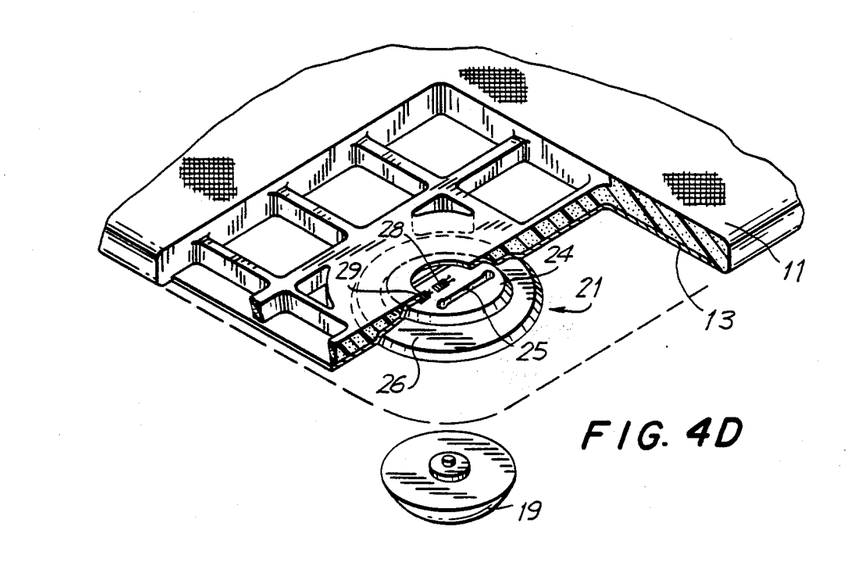
FIG. 4D is a cut-away isometric view of the transducer assembly of an alternative embodiment with a two-layer composite plate.

Each transducer assembly 21 fits within indentations 13a in bottom plate 13 (FIGS. 3 and 4A). The lip 26 of each transducer body 23 extends slightly under bottom plate 13 to hold the assembly in position. Transducer assemblies 21 may be manufactured and calibrated separately and then soldered or otherwise bonded into place in final assembly. The arrangement provides a very compact assembly for the transfer of force to the transducers for measurement.

Directly above each transducer beam 24, and attached thereto, are resistive strain gauges 28 and 29. The center strain gauge 28 and the edge strain gauge 29 are each attached at points of maximum strain on the beam. The center strain gauge is at a point of maximum tensile strain, and the edge strain gauge, which straddles the "joint" between the bendable transducer beam 2 and the fixed portion of transducer body 23, is at the point of maximum compressive strain. In this way, strain gauges 28, 29 can measure the strain in transducer beam 24, which is directly proportional to the load exerted by the foot on the beam. In the preferred embodiment illustrated, two strain gauges are provided for each transducer assembly. Each gauge has two electrical leads for attachment to electronic circuitry (described below) for measurement of the load on the beam.

As best seen in FIG. 3, immediately above the bottom plate containing the transducer assemblies is the center core plate 12. Center core plate 12 defines various varieties for housing various components of the invention. Shown, for example, are cavities 35 for indentations 13a formed in bottom plate 13 for the transducer assemblies 21; cavities 36 for batteries 37; cavity 38 for the LCD 16; a partial cavity 39 for a printed circuit board (PCB) 40; a cavity 41 for an integrated circuit 42; and other cavities 43 for other electronic components contained on PCB 40, which electronic components are shown generally as items 44.

The PCB 40 containing electronic components 42, 44 and LCD 16 fits within cavity 39. In the preferred embodiment, all the electronic components are soldered or otherwise electrically connected to a PCB with an extremely thin vertical dimension (e.g., less than 0.030"). It is possible, furthermore, to surface mount all the components onto the PCB so as to eliminate the solder beads below the PCB and to further reduce the overall vertical dimension of the electronic assembly. PCB 40 may be electrically connected to removable batteries 37 via wires 49, which wires may be copper bonded to plastic to form thin ribbons to permit thinness of construction of the scale. Batteries 37 may, for example, comprise lithium coin type batteries, which are extremely thin, yet provide sufficient power to power the components for a period of one to two years, depending on the frequency of use of the scale. Alternatively, it is possible to use card-shaped batteries with an even thinner vertical dimension. The ends of wires 49 are also connected to the leads (not shown) of the strain gauges PCB 40 with its accompanying wires may be bonded into the cavities in center core plate 12 with adhesive or the like so as to form a relatively solid construction, to withstand shaking which may occur if the scale is transported and to increase the rigidity of the composite plate.

Covering the undersurface of PCB 40, wires 49 and batteries 37 is bottom plate 13 (see FIG. 3). The bottom plate contains an opening 45 for removal of the batteries 37. The battery compartment is covered from below with waterproof battery compartment cover 48 on the underside of the bottom plate. Cover 48 may be screw-in, snap-in or slidably mounted.

It is also possible to have an additional cavity and cover over all or part of the printed circuit board to make it possible to dismantle and repair it. Alternatively, it is possible to house the batteries and the printed circuit board, including the electronic components, in thin plastic compartments which may be slid into the composite plate from the top and bottom edges of the plate, rather than from below. As shown in FIG. 2B, small hanging hole 20 is provided at the top end of the bottom plate to make it possible to hang the scale on the wall.

The mechanical operation of weight measurement may now be described. Referring to FIGS. 4A, 4B, 4C, and 4D, as weight presses down on the top plate 11, the load is transmitted through the transducer assemblies 21 to the supporting feet 19. A force equal and opposite to the weight is the transmitted by feet 19 upwards to the transducer beams 24. This causes each transducer beam 24 to deflect upwards. When the weight is removed, transducer beam 24, which is of high modulus of elasticity, returns to its original flat position flush with the upper surface of transducer body 23.

The total force exerted upwards by the supporting feet, even if the weight is unevenly distributed on the top of the composite plate, must be equal to the weight pressing down from above. To know the value of this weight, one must know the value of the upward forces exerted on the four beams 24. These forces create strains at the center and at the edge of the beams which are proportional to the force exerted at its center vertically from below.

The upward deflection of the transducer beams 24 places the center strain gauges 28 in tension and the edge strain gauges 29 in compression, as the strain gauges are similarly deflected upward. This causes the electrical resistance of the strain gauges to vary, varying any voltage differential which may be applied to the gauges in direct proportion to the strain in the strain gauges and thus modulating any electrical current which may be flowing through the gauges. Since the strain gauges are of the same type, they produce similar voltage differentials but of opposite signs. These can be added to produce approximately double the voltage differential of one strain gauge, thus doubling the sensitivity of each transducer. Having two gauge emitting signals of opposite signs also cancels any temperature effects on the strain gauges, and thus provides a distinct advantage over prior art scales, such as that disclosed by Ostrelich, which require thermal insulation.

Figure 5:
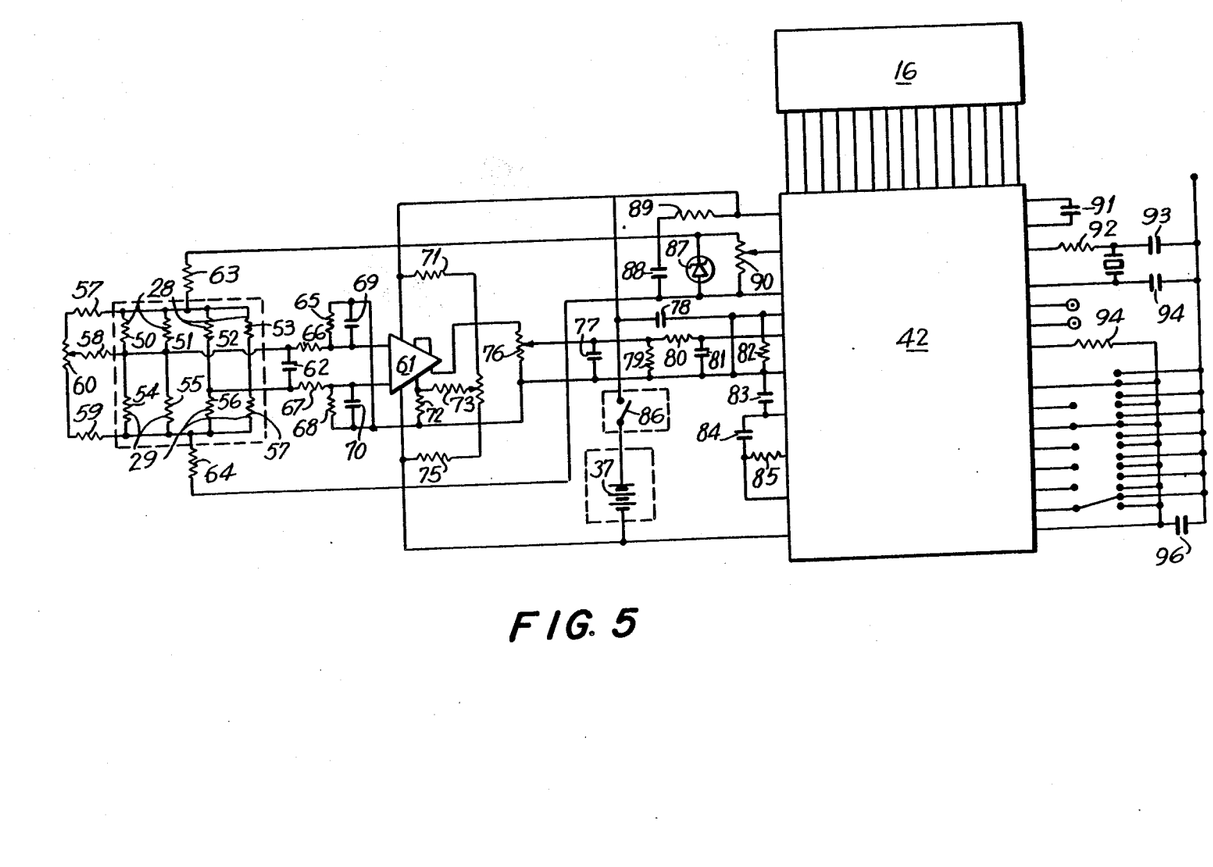
FIG. 5 is a schematic diagram showing the electronic components of the scale of the present invention.

Turning now to the electronic circuitry of the present invention, FIG. 5 shows schematically the arrangement of components for converting signal outputs from the several strain gauges 28 29 into a digital read-out of the weight on the scale. In electrical operation, the strain gauges are arranged in a Wheatstone bridge configuration, so that the voltage differentials of all the strain gauges together may be summed up, the sum being proportional to the total weight on the top plate 11. This total voltage differential results in an analog signal that is fed into an integrated circuit (IC) 42, which converts it into a digital signal for driving LCD display 16. The total voltage differential may be scaled up or down as desired s that the digits of the display actually correspond to the weight expressed in pounds or kilograms, as required.

In FIG. 5, the center strain gauges 28 are shown schematically as resistors 50-53 and edge strain gauges 29 are shown schematically as resistors 54-57, connected in parallel in two bridges, which electrically act as a single bridge. Each strain gauge may, for example, have a resistance of 350 ohms. For a given load on the composite plate, the total resistance at the output of the Wheatstone bridge is constant regardless of changes in the resistance of the individual strain gauges, thus permitting constant and accurate read-out of the weight despite uneven placement of weight on the scale.

A high-resistance parallel circuit (resistors 57-60) is used for zero-balance in order to cancel bridge component mismatch at zero applied load. Opposite legs of the bridge are connected to the strain gauges 29 which are placed in compression (decreasing resistance), and to gauges 28, which are placed in tension (increasing resistance), respectively, in order to give the highest sensitivity when a load is applied.

The bridge is energized with a regulated 1.2 volt power supply (such as provided by batteries 37) in order to maintain a calibrated output throughout the life of the batteries. Batteries 37 may be of the 3 volt, 250 mah type.

The signal at the output of the Wheatstone bridge is amplified by amplifier 61, filtered, and then converted to digital form by an analog-to-digital (A/D) converter contained within integrated circuit 42. Integrated circuit 42 is connected to LCD display 16, and also provides a driving function for the display. Conventional switch 86 is a momentary "on" switch for permitting power to flow to the circuitry when one is ready to use the scale. It may, for example, comprise a membrane switch to minimize the thickness of the construction.

The difference voltage signal at the output of the Wheatstone bridge is calibrated so a to display 10 microvolts/pound. Amplifier 61 may, for example, comprise an LM363D precision instrumentation amplifier, which is connected so as to have a fixed gain of 100, and an extremely low offset voltage drift. A filter network (elements 63-70), is placed at the input of amplifier 61 in order to eliminate electrical noise. An offset voltage adjustment network (elements 71-75) compensates for any output due to this effect. A gain control potentiometer 76 acts as a span calibration and can be used to calibrate the scale in pounds or kilograms.

The voltage is then fed, through another filter network (elements 77-85) into IC 42, which includes a 4½ digit, single-chip A/D converter (ICL7129), which converts the input voltage into a value for LCD 16 with better than 0.05% accuracy. Integrated circuit 42 also contains the driver circuitry necessary to operate display 16.

The external voltage reference diode 87 (ICL8069) and associated elements 88-90 are used to energize the bridge and IC with regulated power from batteries 37.

In the preferred embodiment, display 16 is of the LCD type which requires minimal operating current. It may be of triplex design which permits three elements to be energized per control line from IC 42. Resistor 60 may be used for zero adjust. Resistor 76 be used for span adjust (i.e., may be adjusted to denote different units of weight measurement, such as pounds or kilograms). Components 91-96 complete the circuit. The entire circuit draws less than 5 milliamperes of current from the batteries during operation.

Nominal values for the electronic components in the preferred embodiment are as follows:

| FIG. 5 Element No. | Nominal Value |
| --- | --- |
| 37 | DL2430, 3 V, 250 mah |
| 42 | ICL7129 |
| 50-57 | 350 ohm |
| 57 | 10K ohm, ¼ W |
| 58 | 10K ohm, ¼ W |
| 59 | 10K ohm, ¼ W |
| 60 | 10K ohm |
| 61 | LF363D or LM363D |
| 62 | 10 uF |
| 63 | 150 ohm, ¼ W |
| 64 | 150 ohm, ¼ W |
| 65 | 1 MEG, ¼ W |
| 66 | 10K ohm, ¼ W |
| 67 | 10K ohm, ¼ W |
| 68 | 1 MEG, ¼ W |
| 69 | 0.01 uF |
| 70 | 0.01 uF |
| 71 | 47K ohm, ¼ W |
| 72 | 50 ohm, ¼ W |
| 73 | 10K ohm, ¼ W |
| 74 | 10K ohm |
| 75 | 47K ohm, ¼ W |

| FIG. 5 Element No. | Nominal Value |
| --- | --- |
| 76 | 10K ohm |
| 77 | 0.01 uF |
| 78 | 0.1 uF |
| 79 | 1 MEG, ¼ W |
| 80 | 1 MEG, ¼ W |
| 81 | 0.1 uF |
| 82 | 1.2K, ¼ W |
| 83 | 560 pF |
| 84 | 0.1 uF |
| 85 | 150K, ¼ W |
| 86 | Momentary On Switch |
| 87 | ICL8069 or ICL8096 |
| 88 | 6.8 uF |
| 89 | 1K, ¼ W |
| 90 | 10K ohm |
| 91 | 1.0 uF |
| 92 | 270K, ¼ W |
| 93 | 10 pF |
| 94 | 5 pF |
| 95 | 12K, ¼ W |
| 96 | 6.8 uF |

The electronic circuit thus described operates to sum the signal outputs of the strain gauges to yield a signal proportional to the total weight on the composite plate, which signal is then simplified and digitized to drive display device to give a numerical read-out of the weight.

The electronic circuitry described above is the preferred configuration for operating the scale of the present invention. There are a number of additional electronic features which may be incorporated into the scale without requiring a physical modification or a change in the scale's mode of operation. These include additional circuits for automatic zero-adjust; for locking the display on for a few seconds after a person steps down or the object is removed to enable the person to pick up the scale and look at the display at a closer distance; for switching the scale on automatically when a person touches it or steps on it; or for weighing something while a person is holding it (e.g. a suitcase) by zeroing out their individual weights first (e.g. weighing the items separately first, pushing a bottom and then weighing them again holding the object). Similarly, it is possible, for example, to light the display from below with an electro-luminescent film or other light-producing element which consumes a small amount of electrical current so that it may be read easily in a darker room. It is also possible to separate the display and the electronic controls from the composite plate in a separate compartment, connected to the plate by wire or by remote control.

It will be apparent that many other modifications and variations may be effected without departing from the scope of the novel concepts of this invention, as defined in the claims appended hereto:

What is claimed is:

1. A low-profile and light-weight portable electronic scale, comprising:
   (a) a thin and rigid load-bearing composite plate comprising a plurality of layers rigidly bonded together to act as a single structural plate of minimal weight and thickness yet of sufficient size and strength to support the weight of a person standing or an object lying thereon, said plate comprising:
      (i) a top layer of high elastic modulus having high compressive strength;

(ii) a bottom layer of high elastic modulus, which has a high tensile strength and which acts primarily in tension when the composite plate is loaded from above; and (iii) an intermediate light weight, rigid layer which bonds the top and bottom layers to one another and which acts primarily in shear when the composite plate is loaded from above;

(b) at least three supporting feet upon which the composite plate is mounted, the feet being spaced across the bottom layer of the composite plate to support a load placed on the top layer thereof;

(c) at least three thin transducers secured in cavities in the composite plate above the supporting feet so that the entire load on the plate, including its own weight, is transferred to the feet through the transducers, each of the transducers incorporating:

(i) mechanically deformable means free to deform upwards when subjected to a force exerted by the supporting feet from below, and (ii) means for measuring and transforming the deformations into electrical signals; and (d) electronic means of low power consumption and low vertical profile for powering the transducers, for summing their signal outputs, for transforming the result into digital form, and for providing a read-out thereof, said electronic means being housed in cavities within the composite plate.

2. The scale of claim 1 in which the transducers comprise:

(a) mechanically deformable beams rigidly secured in the composite plate but free to deflect upwards in response to a force exerted by the feet from below when the composite plate is loaded from above; and (b) strain gauge means comprising at least one strain gauge bonded to the beam and positioned so as to provide a signal output directly proportional to the load on the beam.

3. The scale of claim 11, in which each transducer beam has attached thereto two strain gauges such that one is placed in compression and the other in tension as they deflect upward in response to a weight pressing down on the composite plate.

4. The scale of claim 1, in which the electronic means comprises:

(i) signal generating means for supplying a signal to each strain gauge;

(ii) means suitable for connecting a power source to the signal generating means;

(iii) means connecting the strain gauges to define a Wheatstone bridge;

(iv) an analog amplifier connected to the output of the Wheatstone bridge for amplifying the output thereof;

(v) an analog-to-digital converter connected to the output of the amplifier;

(vi) a display driver and display coupled to the output of the analog-to-digital converter; and (vii) switch means for enabling power to flow to the circuit;

the electronic circuit operating to provide a display of weight information which is directly proportional to the collective signal outputs of the strain gauges.

5. The scale of claim 1, further comprising four supporting feet disposed near the corners of the composite plate, and including four transducers aligned with the feet.

6. A low-profile lightweight electronic floor scale comprising:

(a) a thin and rigid load-bearing composite plate, comprising a plurality of layers rigidly bonded together to act as a single structural plate of minimal weight and thickness yet of sufficient size and strength to support the weight of a person standing or an object lying thereon, said plate comprising:

(i) a top layer of high elastic modulus having high compressive strength;

(ii) a bottom layer of high elastic modulus, which has high tensile strength and which acts primarily in tension when the composite plate is loaded from above; and (iii) an intermediate light weight, rigid layer which bonds the top and bottom layers to one another and which acts primarily in shear when the composite plate is loaded from above, the several layers defining a plurality of cavities and indentations for receiving mechanical and electrical measuring means therein;

(b) at least three transducers received in and secured to indentations in the bottom surface of the bottom layer of the composite plate, spaced across the composite plate, each transducer having a mechanically deformable beam which is free to deflect upwards;

(c) at least three shallow load-supporting feet supporting the load-bearing composite plate and being aligned with the respective transducers, each foot pressing against the transducer beam from below and being so arranged that the total upward force exerted on the transducer beams by the supporting feet equals the total load on the composite plate;

(d) a plurality of resistive-type strain gauges, at least two for each transducer, boned to the respective transducer beams in selected locations, so that when exposed to an electric current, they each produce a voltage differential proportional to the upward force produced by reaction of the adjacent supporting foot to part of the load on the load-bearing composite plate;

(e) an electronic circuit of low-power consumption, housed in at least one of the cavities defined in the composite plate, and comprising:

(i) means for receiving direct current power;

(ii) means connecting the strain gauges in a Wheatstone bridge arrangement for measuring the total voltage differential produced by all the strain gauges (such differential being proportional to the applied load on the load-bearing composite plate);

(iii) an amplifier circuit for receiving and amplifying the signal produced by the Wheatstone bridge;

(iv) an integrate-circuit analog-to-digital converter for transforming the amplified analog signal into a digital signal and driving a display;

(v) a display coupled to the output of the analog-to-digital converter;

(vi) means for electrically adjusting the display to denote different units of weight measurement; and (vii) switch means for enabling power to flow to the circuit.

* * * * *